United States Patent [19]

Bradbury

[11] Patent Number: 4,826,249
[45] Date of Patent: May 2, 1989

[54] THIN INFLATABLE ELASTOMERIC SEAT

[75] Inventor: James W. Bradbury, Middleton, Ohio

[73] Assignee: General Motors Corporation, Detroit, Mich.

[21] Appl. No.: 158,869

[22] Filed: Feb. 22, 1988

[51] Int. Cl.⁴ .............................................. A47C 7/42
[52] U.S. Cl. ............................ 297/452; 297/DIG. 3; 5/455
[58] Field of Search ................ 297/452, DIG. 3, 455, 297/289; 5/455, 456

[56] References Cited

U.S. PATENT DOCUMENTS

| 1,361,453 | 12/1920 | Frey . | |
|---|---|---|---|
| 2,251,318 | 8/1941 | Blair et al. . | |
| 2,325,223 | 7/1943 | Brewster . | |
| 2,715,231 | 8/1955 | Marston | 5/455 |
| 2,731,652 | 1/1956 | Bishop | 5/455 |
| 3,112,956 | 12/1963 | Schick et al. | 297/DIG. 3 |
| 3,128,125 | 4/1964 | Loewy . | |
| 3,253,861 | 5/1966 | Howard | 297/DIG. 3 |
| 3,326,601 | 6/1967 | Vanderbilt et al. . | |
| 3,635,528 | 1/1972 | Strom | 297/DIG. 3 |
| 4,190,286 | 2/1980 | Bentley . | |
| 4,545,614 | 10/1985 | Abu-Isa et al. . | |
| 4,629,433 | 12/1986 | Magid | 5/455 |

FOREIGN PATENT DOCUMENTS 472664  9/1937  United Kingdom ............... 297/452

Primary Examiner—Peter A. Aschenbrenner
Attorney, Agent, or Firm—William A. Schuetz

[57] ABSTRACT

A thin inflatable elastomeric vehicle seat comprised of a pair of elastomeric sheets which are heat sealed together to define a peripheral manifold and discrete horizontal sections, pressurized with a gas to stretch the elastomeric material into its hysteresis range and then attached to a frame to provide a cushioned seat.

7 Claims, 2 Drawing Sheets

THIN INFLATABLE ELASTOMERIC SEAT

The present invention relates to a vehicle seat and more particularly to a relatively thin, lightweight vehicle seat comprised of a pair of elastomeric sheets heat sealed together to define discrete sections which are then pressurized with a gas to stretch the elastomeric material into its hysteresis range to provide a cushioned seat.

Current production vehicle seats usually contain bulky polyurethane stuffing material. This makes such seats relatively heavy and with a thickness such that little room is left beneath the seats. It has also been proposed to provide thin seats for vehicles, including thin seats using elastomeric seat backing material. For example, in Blair et al, Pat. No. 2,251,318, solid rubber tape or strips reinforced by fabric are stretched over a seat frame. As noted in the Blair et al patent, stretched elastomers have good properties for isolation and absorption of impacts and vibrations and readily deform to fit the shape of the body of the occupant they support.

A disadvantage of using conventional elastomers is that they have too low a modulus of elasticity. They will support a person comfortably under static conditions, but when a vehicle hits a bump or pothole they stretch causing the seat to deflect and bottom out and then rebound. This is presumably the reason the rubber strips in Blair et al were combined with fabric even though that lessens the ability of the strips to conform to the shape of the body of the occupant they support.

U.S. Pat. No. 4,545,617, assigned to the same assignee as the present invention, discloses providing a thin vehicle seat in which a multiplicity of side-by-side elastomeric filaments made from a block copolymer consisting of polytetramethylene terephthalate polyester and polytetramethylene ether are stretched across a vehicle seat frame. The elastomeric filaments had a diameter of between 0.2 and 2 millimeters and the material had a substantially higher modulus of elasticity at 100% elongation than natural rubber and were stretched across the frame in the range of 20–100% elongation. These individual elastomeric filaments conform to the contour of the body of the occupant and provided a seat which is more comfortable and/or had better ride characteristics than if the elastomers were in the shape of natural rubber strips or the like.

While U.S. Pat. No. 4,545,614 discloses a vehicle seat which is extremely comfortable and thus highly acceptable, it nevertheless requires the use of filaments which have to be prestretched and then attached to a frame means, thus requiring a relatively sturdy frame means. The filaments also tend to abrade certain kinds of upholstery trim materials used as a cover overlay for aesthetic reasons.

In accordance with the provisions of the present invention, a relatively thin, lightweight vehicle seat is provided in which a pair of elastomeric sheets made from the same kind of material as disclosed in U.S. Pat. No. 4,545,614, i.e., a block copolymer of polytetramethylene terephthalate polyester and polytetramethylene ether, such as that made by E. I. DuPont de Nemours Company and marketed under the registered trademark Hytrel, and having a substantially higher tensile strength and a substantially higher modulus of elasticity at 100% elongation than natural rubber are heat sealed together at their edges and at different locations to define discrete sections which are thereafter stretched to at least 20%, preferably between 20–100% elongation, by pressurizing the sections with a gas and then sealed off to obtain a seat cushion or backrest which can be readily attached to a frame means to provide a seat or backrest which is as comfortable as conventional foam cushion seats currently being manufactured. This thin inflatable seat, besides being comfortable, can be readily attached to a frame means without stretching the same over the frame means, thus requiring a less sturdy frame means and will not abrade upholstery cover or trim material placed thereover for aesthetic reasons.

Accordingly, it is a broad object of the present invention to provide a new and improved thin inflatable elastomeric seat for an automotive vehicle which includes a frame means, a seat and back rest each comprising a pair of elastomeric sheets made from Hytrel material or the like and which is sealed together adjacent their outer side edges to define a circumferentially extending flange and with the sheets also being heat sealed together transversely of their sides at spaced longitudinal locations therealong to define a plurality of discrete horizontally disposed passages whose ends terminate in a circumferentially extending manifold, and wherein the passages or manifolds are pressurized with a gas to stretch the Hytrel material defining the passages and manifold into its hysteresis range, i.e., preferably at least 20% elongation, to provide a semi-rigid, lightweight cushioned seat and back rest which is relatively thin and which and be readily attached to the seat frame means.

Another object of the present invention is to provide a new and improved seat assembly, as defined in the preceding object, and in which the ends of the horizontally disposed passages are also heat sealed together after being pressurized, to provide a plurality of discrete cushioned sections in the seat and back rest.

Yet another object of the present invention is to provide and new and improved seat assembly, as defined in the next preceding object, and wherein the seat frame means also includes the plurality of thin elastomeric filaments extending laterally across the seat which are also made from a Hytrel material or the like for providing a resilient support for the seat and backrest between the side frames of the seat.

A still further object of the present invention is to provide a new and improved vehicle seat assembly, as defined in the next preceding object, and wherein the seat frame means is made from a lightweight tubular material, such as aluminum.

Another object of the present invention is to provide a new and improved vehicle seat assembly, as defined in the penultimate object, and in which the circumferentially extending flange is adhesively secured to the seat frame means.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the views, and in which.

Figure 1:
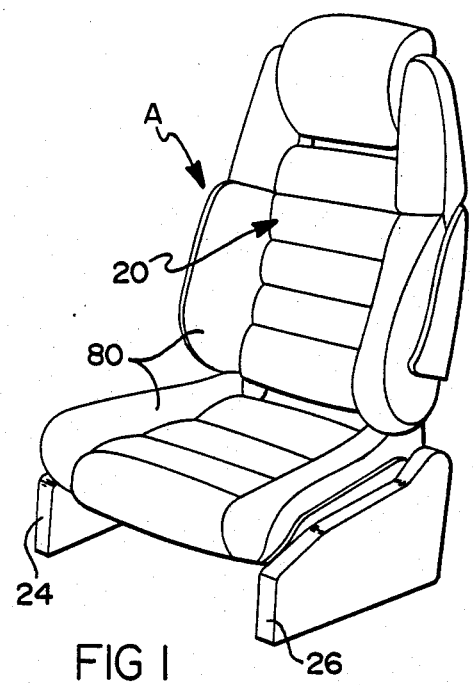
FIG. 1 is a perspective view of the novel seat assembly of the present invention and showing the same in a fashion.
Figure 2:
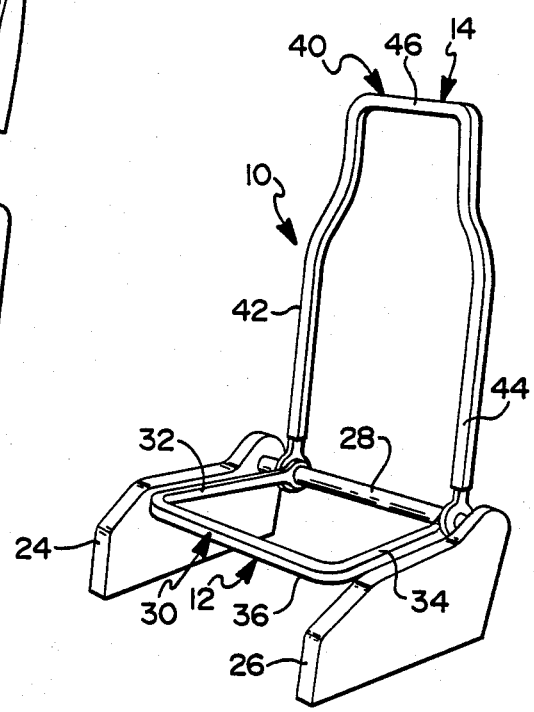
FIG. 2 is a perspective view of the basic seat frame of the seat assembly of the present invention.
Figure 3:
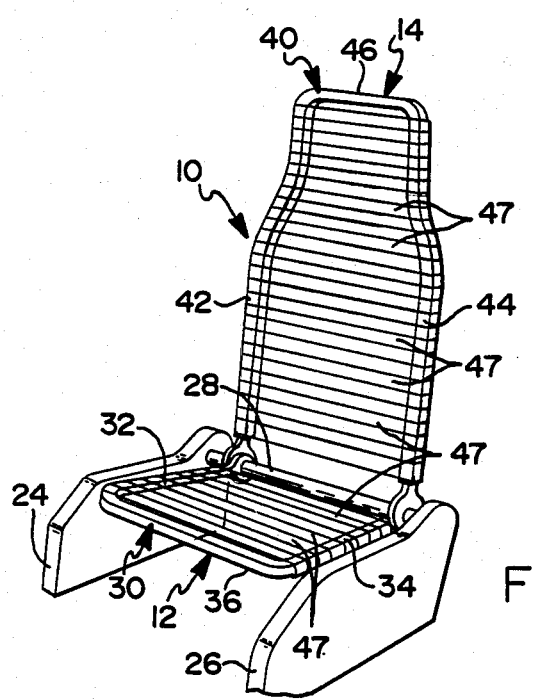
FIG. 3 is a perspective view of the seat frame means of the seat assembly of the present invention and showing backing filaments added thereto.

Referring to FIGS. 1-4 of the drawings, a novel vehicle seat or seat assembly A is there shown. The seat assembly A comprises, in general, a frame means 10, a seat support 12, a back rest support 14, an elastomeric seat cushion 16, an elastomeric back rest cushion 18 and an upholstery trim cover material 20 for covering the seat cushion 16, back rest cushion 18 and some of the frame means 10.

The seat frame means 10 comprises a pair of upright, laterally spaced frames 24 and 26 which are adapted to be mounted to a floor of an automotive vehicle and a cross bar or frame member 28 secured to and supported by the upright frames 24 and 26 adjacent their rear and upper ends. Rigidly secured to the upright frames 24 and 26 and the cross bar 28 is a tubular seat frame 30. The tubular seat frame 30 is generally U-shaped and preferably made from a lightweight material, such as aluminum tubing. The seat frame 30 includes side portions 32 and 34 and an end portion 36 located adjacent the forward end of the side supports 32 and 34. The side support portions 32 and 34 are suitably secured to the upright frames 24 and 26 adjacent the forward end of the seat and are suitably secured to the cross bar 28 at their free ends.

The seat frame means 10 further includes a back support frame 40 which is suitably contoured to the shape of the back rest and which includes a pair of spaced side portions 42 and 44 and an end portion 46 at its upper end. The back support frame 40 is also made from suitable lightweight metal tubing, such as aluminum and has its side portions adjacent the seat frame 30 secured to the cross bar 28. The back rest frame 40 can be secured to the cross bar 28 so as to be rigid therewith or could be suitably pivotally mounted thereon for limited movement toward and from the seat frame 30.

In order to properly support and position the seat and back rest cushions, the seat frame and back rest frame means 30 and 40 have added thereto a coarse winding of eastomeric filaments 47 extending laterally across the side portions 32 and 34 of the seat frame 30 and 42 and 44 of the back rest frame 40. The elastomeric filaments are wound so as to have a one inch pitch and are preferably made from an elastomeric material such as Hytrel or the like. The filaments provide in conjunction with the seat frame 30 and the back rest frame 40 provide a seat and back support which is resilient and compatible with the seat and back rest cushion material employed in making the seat and back rest cushions, as will be next described.

Figure 4:
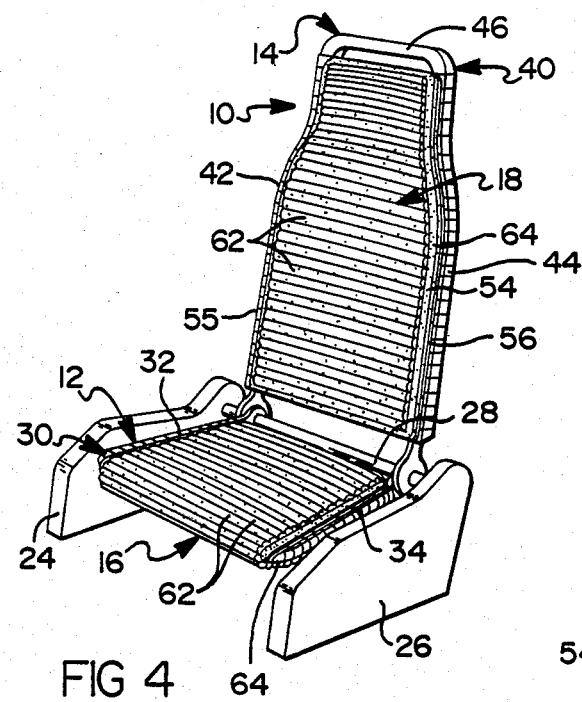
FIG. 4 is a perspective view of a seat assembly of the present invention showing the same with the addition of the inflated seat and back rest added thereto.
Figure 7:
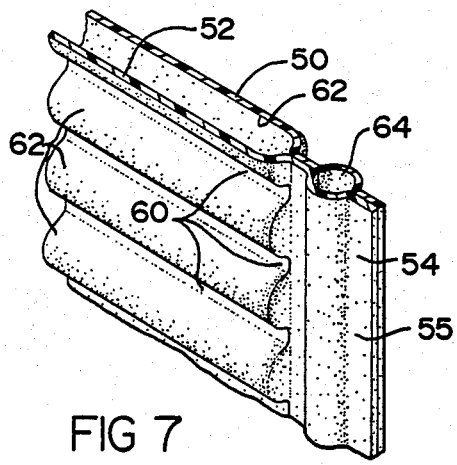
FIG. 7 is an enlarged fragmentary view of part of the cushion shown in FIG. 5, but showing it in its inflated state.

FIG. 4 illustrates the seat and back rest cushions 16 and 18 secured to the seat frame 30 and back rest frame 40. The seat and back rest cushions 12 and 14 are made and formed in the same manner and therefore the same reference numerals will be employed to designate corresponding parts thereof.

Figure 5:
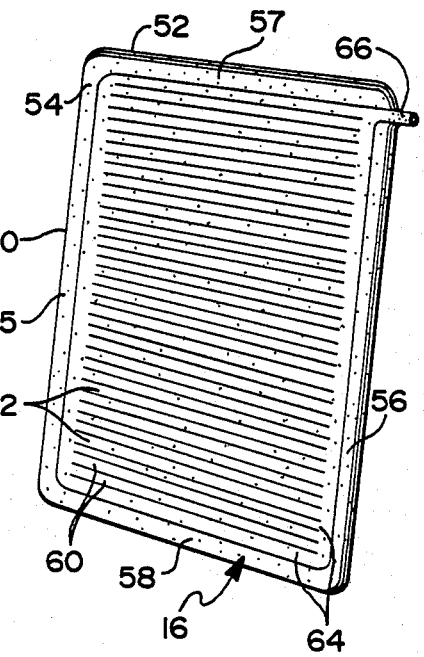
FIG. 5 is a view showing a seat cushion or backrest partially made.
Figure 6:
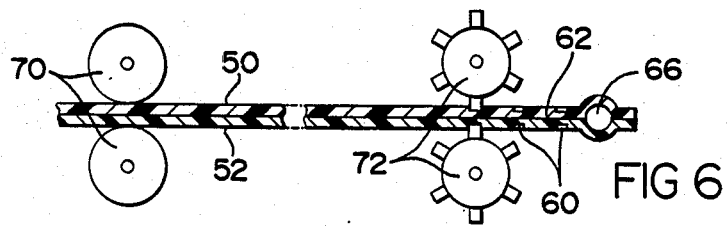
FIG. 6 is a schematic view illustrating, in part, how the seat cushion and back rest cushion are made.

As best shown in FIGS. 5 and 6, the seat cushion 16 is formed by providing a pair of thin sheets 50, 52 made from a Hytrel material or the like and which are positioned one over the other. The elastomeric sheets 50, 52 are heat sealed together a predetermined width adjacent their outer side edges to define a circumferentially extending flange 54 having a pair of side portions 55, 56 and a pair of end portions 57, 58, as best shown in FIG. 5. The sheets are also sealed together transversely of their side flange portions 55, 56 at spaced longitudinal locations 60 therealong to define a plurality of horizontally extending passages 62 whose ends terminate at a location spaced from the adjacent side portions 55, 56 of the circumferentially extending flange 54. The inner side edges of the flange 54 and the ends of the passages 62 along with the passages 62 located closest to the opposite end portions 57, 58 of the sheets define a circumferentially extending manifold 64 adjacent the circumferentially extending flange 54 and which is in communication with each of the passages 62.

Prior to heat sealing together the circumferentially extending outer flange portions 54, a suitable inlet means 66 is provided between the sheets. After the flange 54 is formed and the manifold 64 and passages 62 are formed, pressurized gas, preferably an inert gas, is introduced into the manifold 64 and passages 62 to cause the elastomeric material defining the manifold 64 and passages 62 to be stretched or expanded to within the hysteresis range of the material. It has been found, that the expansion need only be into the low end of the hysteresis range of the material, but it is preferably expanded to at least 20% elongation from its normal free state position. After the sheets 50, 52 are inflated with the inert gas, the inlet 66 can either be removed or sealed off to cause the seat cushion to remain in its inflated state, as shown in FIG. 4.

Although the width of the passages 62 is shown in the drawings as being more or less equal, it should be understood that the width of the various passages 62 could be altered so that some would be larger than others depending on the seating and contour of the seat cushion 16 or backrest 18 desired. Also, in the preferred embodiment, after the seat cushion 16 is inflated, the ends of the passages 62 are passed between heat sealing rollers to cause the same to be heat sealed so as to trap the gas within each of the passages 62 and the manifold 64. This has the advantage that should be any one of the passages 62 be punctured at a later date, only that passage would deflate and not the remainder of the seat cushion 16.

It should also be understood that the seat cushions 16 and/or back rest cushions 18 can be made from the elastomeric sheet material either via a continuous process in which the sheets 50, 52 are pressed together under a series of heated rollers 70, 72 to cause the outer circumferential flange to be heat sealed, the transverse passages 62 and manifold 64 to be formed and inflated and thereafter the formed seat cushion or back rest trimmed to its final shape. Alternately, the two sheets could be initially trimmed to their final shape and then heat sealed together.

After the seat cushions 16 and back rest cushions 18 are made as described above, they can be secured to their respective seat frame 30 and back rest frame 40 via any suitable means such as by adhesively bonding the same thereto. To ensure good bonding, the circumferentially extending flange 54 could be heat corrugated or rippled to enhance the bonding to the seat frame means 10.

After the seat and back rest cushions 16, 18 are attached to the seat frame means 10, as shown in FIG. 4, suitably shaped or contoured upholstered trim or cover material 20 can be added thereover and secured to the frame means 10 for aesthetic purposes. In the embodiment shown in FIG. 1, in addition to the upholstered trim 20, additional pre-upholstered side portions 80 for the seat and back rest could be added and attached to the frame means 10 to provide a contoured bucket like looking seat. Alternately, the pre-upholstered side portions 80 could be also made from an inflatable material like the seat cushion 16 and back rest 18. The pre-upholstered side parts 80 can be attached to the seat frame means 10 in any suitable or conventional manner.

As noted before, the elastomeric sheet material for forming the seat and back rest cushions 16 and 18 is comprised of: a block copolymer of polytetramethylene terephthalate polyester and polytetramethylene ether. This material is a combination of hard crystalline segments of the polyester and soft amorphous segments of the poly ether. Annealing the sheets at a specific temperature while they are stretched orients the polyester molecules in one direction while leaving the poly ether molecules unaffected. This increases the material stiffness and more than triples its strength. An example of such a material is Hytrel, a registered trademark of the E. I. DuPont de Nemours Company, and this material has been hereinbefore and will hereinafter be referred to as Hytrel.

Hytrel has at least five times the modulus of elasticity of ordinary or natural rubber. The oriented Hytrel material has a much higher ultimate tensile strength and a much higher modulus of elasticity at 100% elongation than natural rubber. The Hytrel stress strain curve tends to plateau in the range of strain between 20-100% elongation. Thus, Hytrel material prestretched in this range will provide good comfort and will be easily be flexed to adjust to the shape of the occupant. However, with a sudden change of stress, it will stiffen at strains above 100% to support an additional load.

The seat back and seat cushions 18 and 16 have the Hytrel elastomeric sheet material prestretched 20% or more when inflated to provide for the support and comfort needed. It has also been found that with the use of Hytrel material, the stress strain measurements show that it has good hysteresis—that is, the stress at a given strain during stretching was much higher than during release of stress. This means that not all of the energy put into the material during stretching is recovered when the material is returned to its normal free state position. Indeed, a large fraction of the energy input during stretching is lost or dissipated, this loss being hysteresis. This is very desirable because it means that much of the energy absorbed during stretching is dissipated and not regained when the material is relaxed. This results in better dampening of impacts.

It should thus be apparent that with the use of a Hytrel sheet material which is pre-stretched by the pressurization of the passages and manifold of the seat and back rest 16 and 18 that it provides a very comfortable, relatively thin seat which has good dampening characteristics and which is much thinner than conventional car seats.

From the foregoing, it should be apparent that a novel seat assembly has been provided which is relatively thin, gives good comfort, is of less weight than conventional foam seats and which is high in strength and provides good hysteresis characteristics. In addition, the seat assembly does not require a very sturdy frame in that only a lightweight frame is required and lends itself to be readily upholstered with trim or cover material for aesthetic reasons.

Although the illustrated embodiment hereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. A vehicle seat assembly comprising:
   frame means including laterally spaced, generally horizontal side frame portions and resilient means extending thereacross for supporting a seat and laterally spaced, generally vertically extending side frame portions and resilient means extending thereacross for supporting a backrest,
   said seat and backrest each comprising a pair of elastomeric sheets which are sealed together adjacent their outer side edges to define a circumferentially extending flange having a pair of side portions and a pair of end portions, said sheets being made from a block copolymer consisting of polytetramethylene terephthalate polyester and polytetramethylene ether,
   said sheets also being sealed together transversely of their side flange portions at spaced longitudinal locations therealong to define a plurality of horizontally extending passages whose ends terminate at a location spaced from the adjacent side portions of said flange to define with the sealed side edges a manifold between said side flange portion and said ends of said passages which are in communication with each other,
   said passages and manifold being pressurized with a gas to stretch the block copolymer material defining the passages and manifold into its hysteresis range, said passages being sealed off from said manifold after pressurization to provide a semi-rigid lightweight and cushioned seat and backrest which is relatively thin and provided with individual cushioned portions, and means for attaching said circumferential flange of said seat and backrest to said frame means.

2. A vehicle seat assembly comprising:
   frame means including laterally spaced, generally horizontal side frame portions and thin resilient means extending thereacross for supporting a seat and laterally spaced, generally vertically extending side frame portions and thin resilient means extending thereacross for supporting a backrest,
   said seat and backrest each comprising a pair of elastomeric sheets which are sealed together adjacent their outer side edges to define a circumferentially extending flange having a pair of side portions and a pair of end portions, said sheets being made from a block copolymer consisting of polytetramethylene terephthalate polyester and polytetramethylene ether,
   said sheets also being sealed together transversely of their side flange portions at spaced longitudinal locations therealong to define a plurality of horizontally extending passages whose ends terminate at a location spaced from the adjacent side portion of said flange, said side edges of said flange and said ends of said passages along with the passages located closest to the end portions of said flange defining a circumferentially extending manifold in communication with said passages, said manifold having an inlet and said passages and manifold being pressurized with a gas to stretch the block copolymer material defining the passages and manifold into its hysteresis range, said manifold being sealed off and said ends of said passsages being sealed off from said manifold after pressurization to provide a semi-rigid lightweight seat and backrest which is relatively thin and provided with individual cushioned portions, and means for attaching said circumferential flange of said seat and backrest to said frame means.

3. A vehicle seat assembly comprising:

frame means including laterally spaced, generally horizontal side frame portions and thin resilient means extending thereacross for supporting a seat and laterally spaced, generally vertically extending side frame portions and thin resilient means extending thereacross for supporting a backrest, said seat and backrest each comprising a pair of elastomeric sheets which are sealed together adjacent their outer side edges to define a circumferentially extending flange having a pair of side portions and a pair of end portions, said sheets being made from a block copolymer consisting of polytetramethylene terephthalate polyester and polytetramethylene ether, said sheets also being sealed together transversely of their side flange portions at spaced longitudinal locations therealong to define a plurality of horizontally extending passages whose ends terminate at a location spaced from the adjacent side portion of said flange, said side edges of said flange and said ends of said passage along with the passage located closest to the end portions of said flange defining a circumferentially extending manifold in communication with said passages, said manifold having an inlet and said passages and manifold being pressurized with an inert gas stretch the block copolymer material defining the passages and manifold to at least 20% elongation from its free state condition, said manifold being sealed off and said ends of said passages being sealed off form said manifold after pressurization to provide a semi-rigid lightweight and cushioned seat and backrest which is relatively thin and provided with individual cushioned portions, and means for attaching said circumferential flange of said seat and backrest to said frame means.

4. A vehicle seat assembly, as defined in claim 1, and wherein said pressurized gas stretches said elastomeric sheet material to at least 20% elongation from its free state condition.

5. A vehicle seat assembly, as defined in claim 3, and wherein said thin resilient means comprises a plurality of thin elastomeric filaments lightly stretched across and attached to the side frame portions of said frame means.

6. A vehicle seat assembly, as defined in claim 5, and wherein said frame means is made from a lightweight metal tubular material.

7. A vehicle seat assembly, as defined in claim 6, and wherein said thin elastomeric filaments are made from a block copolymer consisting of polytetramethylene terephthalate polyester and polytetramethylene ether.

* * * * *